(12) United States Patent
Mannen et al.

(10) Patent No.: US 7,386,598 B2
(45) Date of Patent: Jun. 10, 2008

(54) COMPUTER SYSTEM WITH VIRTUALIZATION FUNCTION

(75) Inventors: Akihiro Mannen, Yokohama (JP); Yasuyuki Mimatsu, Yokohama (JP); Hiroshi Arakawa, Sagamihara (JP); Naoto Matsunami, Hayama (JP); Kenji Muraoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 630 days.

(21) Appl. No.: 10/219,926

(22) Filed: Aug. 14, 2002

(65) Prior Publication Data

US 2003/0204572 A1    Oct. 30, 2003

(30) Foreign Application Priority Data

Apr. 24, 2002    (JP)    ............... 2002-121631

(51) Int. Cl.
    *G06F 15/16*    (2006.01)
(52) U.S. Cl. .................. 709/216; 711/148
(58) Field of Classification Search ............. 370/389, 370/216; 711/165, 162, 203, 148; 719/318; 709/216
See application file for complete search history.

(56) References Cited

U.S. PATENT DOCUMENTS

| | | | | |
|---|---|---|---|---|
| 5,956,489 | A * | 9/1999 | San Andres et al. | 709/221 |
| 6,366,987 | B1 * | 4/2002 | Tzelnic et al. | 711/162 |
| 6,606,690 | B2 * | 8/2003 | Padovano | 711/148 |
| 6,694,413 | B1 * | 2/2004 | Mimatsu et al. | 711/162 |
| 6,779,094 | B2 * | 8/2004 | Selkirk et al. | 711/165 |
| 6,779,095 | B2 * | 8/2004 | Selkirk et al. | 711/165 |
| 6,804,755 | B2 * | 10/2004 | Selkirk et al. | 711/165 |
| 6,804,819 | B1 * | 10/2004 | Bates et al. | 719/318 |
| 2001/0054093 | A1 | 12/2001 | Iwatani | |
| 2002/0019920 | A1 | 2/2002 | Reuter et al. | |
| 2002/0053009 | A1 * | 5/2002 | Selkirk et al. | 711/162 |
| 2002/0156984 | A1 * | 10/2002 | Padovano | 711/148 |
| 2002/0156987 | A1 * | 10/2002 | Gajjar et al. | 711/203 |
| 2002/0178335 | A1 * | 11/2002 | Selkirk et al. | 711/162 |
| 2003/0005248 | A1 * | 1/2003 | Selkirk et al. | 711/165 |
| 2003/0167312 | A1 | 9/2003 | Mori | |
| 2003/0210686 | A1 * | 11/2003 | Terrell et al. | 370/389 |

FOREIGN PATENT DOCUMENTS

| | | |
|---|---|---|
| JP | 06-75707 A | 3/1994 |
| JP | 11-338640 A | 12/1999 |
| JP | 2000-132343 | 5/2000 |
| JP | 2002-007304 A | 1/2002 |

OTHER PUBLICATIONS

Robert M. Montague, et al., "Virtualizing the SAN," Equity Research, Morgan Keegan & Co. (Jul. 5, 2000), pp. 1-20.

* cited by examiner

*Primary Examiner*—Jason D Cardone
*Assistant Examiner*—Mitra Kianersi
(74) *Attorney, Agent, or Firm*—Townsend and Townsend and Crew LLP

(57) ABSTRACT

A method of creating a copy of a virtualized storage region in a data processing system for virtualizing the storage region. A server manages the correlation between the virtualized storage region and the physical storage region, utilizes the function of the storage unit for those physical storage regions having a function, and the function for those physical storage regions without the function, to efficiently copy the virtualized storage region.

20 Claims, 11 Drawing Sheets

FIG.4

| VIRTUALIZED VOLUME No. | SAN ADDRESS |
|---|---|
| 0 | WWN=50:00:60:e8:02:f0:67:00 LUN=00 |
| 1 | WWN=50:00:60:e8:02:f0:67:01 LUN=01 |
| 2 | WWN=50:00:60:e8:02:f0:67:02 LUN=02 |
| 10 | WWN=50:00:60:e8:02:f0:67:03 LUN=03 |
| 100 | WWN=50:00:60:e8:02:f0:67:04 LUN=04 |
| 101 | WWN=50:00:60:e8:02:f0:67:05 LUN=05 |
| 102 | WWN=50:00:60:e8:02:f0:67:06 LUN=06 |
| 103 | WWN=50:00:60:e8:02:f0:67:07 LUN=07 |

FIG.5

| UNIT No. | PHYSICAL VOLUME No. | SAN ADDRESS | VENDER IDENTIFIER | MODEL NAME | PRODUC-TION No. | VER-SION No. | STATE | INT. VOL. MULTIPLEXING FUNCTION | EXT. VOL. MULTIPLEXING FUNCTION |
|---|---|---|---|---|---|---|---|---|---|
| 0 | 0 | WWN=50:00:60:e8:02:f0:67:10 LUN=00 | VENDER_A | RAID_n | 4422 | 0111 | in use | yes | yes |
| 0 | 1 | WWN=50:00:60:e8:02:f0:67:11 LUN=01 | VENDER.A | RAID_n | 4422 | 0111 | in use | yes | yes |
| 0 | 2 | WWN=50:00:60:e8:02:f0:67:12 LUN=02 | VENDER_A | RAID_n | 4422 | 0111 | in use | yes | yes |
| 0 | 10 | WWN=50:00:60:e8:02:f0:67:20 LUN=01 | VENDER.A | RAID_n | 4422 | 0111 | access inhibited | yes | yes |
| 0 | 11 | WWN=50:00:60:e8:02:f0:67:21 LUN=02 | VENDER_A | RAID_n | 4422 | 0111 | in use | yes | yes |
| 1 | 0 | WWN=00:11:22:33:44:55:66:77 LUN=00 | VENDER_B | ARRAY1 | 0001 | 0202 | in use | no | no |
| 1 | 1 | WWN=00:11:22:33:44:55:66:78 LUN=01 | VENDER_B | ARRAY1 | 0001 | 0202 | in use | no | no |
| 1 | 2 | WWN=00:11:22:33:44:55:66:79 LUN=02 | VENDER_B | ARRAY1 | 0001 | 0202 | in use | no | no |
| 1 | 10 | WWN=00:11:22:33:44:55:66:80 LUN=00 | VENDER_B | ARRAY1 | 0001 | 0202 | in use | no | no |
| 1 | 12 | WWN=00:11:22:33:44:55:66:82 LUN=00 | VENDER_B | ARRAY1 | 0001 | 0202 | in use | no | no |
| 1 | 13 | WWN=00:11:22:33:44:55:66:83 LUN=00 | VENDER_B | ARRAY1 | 0001 | 0202 | in use | no | no |

FIG.6

| VIRTUALIZED VOL. No. | VIRTUALIZED VOL. SIZE | PHYSICAL VOL. No. | COUPLING ORDER | UNIT No. | PHYSICAL VOL. No. | PHYSICAL VOL. RANGE | ATTRIBUTE OF MULTIPLEXING |
|---|---|---|---|---|---|---|---|
| 0 | 2000 | 1 | 1 | 0 | 0 | 0-1999 | PAIR No.=0 SOURCE OF COPY |
| 1 | 1000 | 1 | 1 | 1 | 0 | 1000-1999 | PAIR No.=1 SOURCE OF COPY |
| 2 | 3000 | 2 | 1 | 0 | 2 | 0-1499 | PAIR No.=2 SOURCE OF COPY |
|   |   |   | 2 | 1 | 2 | 0-1499 |   |
| 10 | 1000 | 2 | 1 | 0 | 1 | 1500-1999 | NO PAIR |
|   |   |   | 2 | 1 | 1 | 0-499 |   |
| 100 | 2000 | 1 | 1 | 0 | 10 | 0-1999 | PAIR No.=0 DESTINATION TO BE COPIED |
| 101 | 2000 | 1 | 1 | 1 | 13 | 0-1999 | PAIR No.=0 DESTINATION TO BE COPIED |
| 102 | 1000 | 1 | 1 | 1 | 10 | 0-999 | PAIR No.=1 DESTINATION TO BE COPIED |
| 103 | 3000 | 2 | 1 | 0 | 12 | 0-1499 | PAIR No.=2 DESTINATION TO BE COPIED |
|   |   |   | 2 | 1 | 12 | 0-1499 |   |

FIG.7

| PAIR No. | COPY SOURCE VOLUME | COPY DESTINATION VOLUME |
|---|---|---|
| 0 | 0 | 100 |
|   |   | 101 |
| 1 | 1 | 102 |
| 2 | 2 | 103 |

COMPUTER SYSTEM WITH VIRTUALIZATION FUNCTION

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

This invention relates to a computer system for handling a virtualized storage region. Computer systems used in banks and stock companies usually make back-up copies of data contained in those computer systems (hereinafter referred to as "backup") to prevent loss of data due to a failure in the system.

Japanese Patent Laid Open No. 132343/2000 discloses a method in which a copy of data is created in a storage unit system of a computer system (the method herein referred to as a "snapshot") to back-up the data based on the copied data. There has further been proposed a method of creating a copy of data not in the storage unit system but between the storage unit systems (hereinafter referred to as "remote copy").

Currently, a tremendous amount of data is processed in computer systems, and the users are bearing increased costs for managing the storage unit systems. A report "Virtualizing the SAN," published Jul. 5, 2000, by Morgan Keegan, a research company, discloses a system in which storage regions offered by a plurality of storage unit systems in a computer system are virtualized to form a theoretical storage region (virtualized volume), and the virtualized volume is offered to the user (host computer) to decrease the user's cost of managing the storage unit.

BRIEF SUMMARY OF THE INVENTION

A computer system for realizing the above virtualization may be connected to any type of storage unit systems. That is, it may be connected to storage unit systems that are not capable of offering such functions as the above mentioned snapshot and remote copy. In this case, a storage unit system constituting a portion of a virtualized volume is not capable of offering a function such as snapshot. Consequently, the computer system realizing the virtualization is not allowed to conduct processing such as snapshot for the whole virtualized volume. Thus, snapshot technology cannot be used in the backup process for the computer system.

This invention provides a computer system and a method for providing a function such as copying the virtualized volume which is lacking in the storage unit system of a computer system having a snapshot function, as well as in a storage unit system without the above function.

In this invention, a computer that offers a virtualized storage region to a computer used by a user, confirms the function of the storage unit system connected to the computer system. That is, it confirms the function for copying the data in the storage unit system, instructs the execution of the function possessed by the storage unit system, or the computer itself, that offers the virtualized storage region, and executes the above function based on the result of confirmation. In particular, when the function of the storage unit system is for copying the data in the storage unit system, then the processing to be executed by the computer is for reading the data to be copied from the storage unit system and transferring the data to the corresponding storage region.

In one embodiment of the invention, the storage unit system may include a function for establishing a Redundant Array of Independent Disks (RAID) in the storage unit system. In another embodiment of the invention, the computer that offers the virtualized storage region may send a message to the storage unit systems connected to the computer system to confirm the type of function provided by the storage unit systems.

BRIEF DESCRIPTION OF THE DRAWINGS

FIG. 4 illustrates an example of virtualized volume data 110;

FIG. 5 illustrates an example of physical volume data 120;

FIG. 6 illustrates an example of mapping data 130;

FIG. 7 illustrates an example of pair state data 140;

DESCRIPTION OF THE PREFERRED EMBODIMENTS

An embodiment of the invention is now be described in detail in conjunction with the drawings. Herein, "storage unit system" encompass both a single storage unit as represented by a disk unit, and a set of JBODs (Just a Bunch of Disks, not set up as an array) and a set of a plurality of storage units as represented by RAIDS and a control unit therefor.

Figure 1:
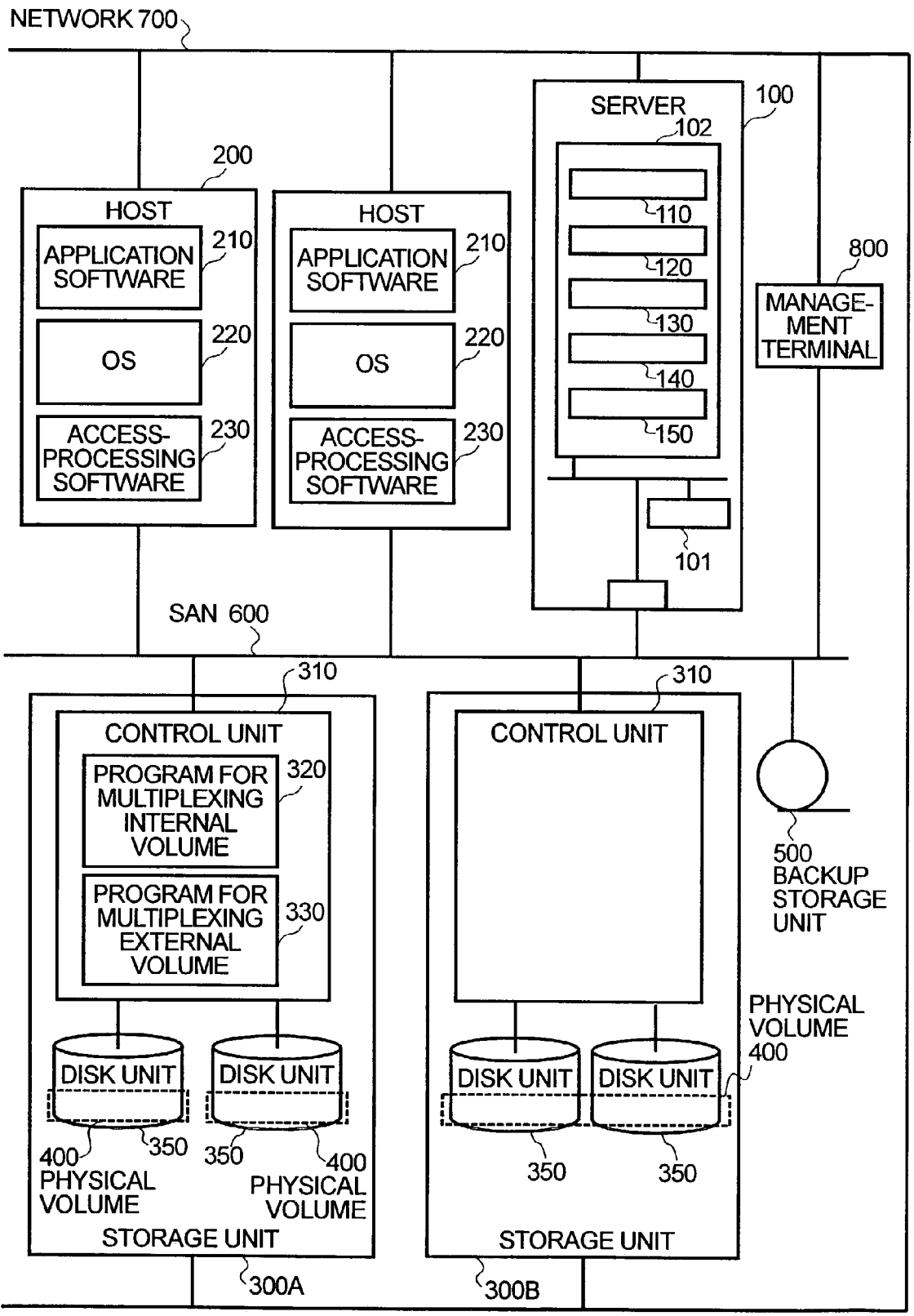
FIG. 1 is a view illustrating the configuration of a computer system in an embodiment of this invention.

FIG. 1 is illustrates the configuration of an embodiment of a computer system to which the invention is applied. The computer system includes a computer (server)100 for managing the data to be virtualized, a computer (host) 200 that uses the storage unit, storage unit systems 300A and 300B, a backup storage unit system 500, and a computer (management terminal) 800 with which a user manages the computer system.

The management server 100, host 200, storage unit systems 300A and 300B, backup storage unit 500 and management terminal 800 are connected together through a network 700. The protocol and standards used in network 700 are exemplified by an internet protocol (IP). The devices connected through the network 700 have interfaces (connection portions) for connection to network 700.

Server 100, host 200, storage unit systems 300A and 300B, backup storage unit system 500 and management terminal 800 are further connected through a storage area network (SAN) 600 which is a route for transferring the data. The protocol and standards used in SAN 600 are exemplified by fiber channel (FC), IP and Infini Band®. The units connected through SAN 600 have interfaces (connection portions) for connection to the SAN.

Server 100 has a processor 101 and a memory 102. The memory stores virtualized volume data 110, physical volume data 120, mapping data 130, and pair state data 140. Mapping data 130 includes a storage region (hereinafter referred to as "physical volume") which storage unit system 300 offers to an external unit, and management data that includes data corresponding to the virtualized volume. Other data will be described later.

Server 100 contains a volume multiplexing program 150 in a memory. When storage unit system 300 does not have a function for copying the physical volume, volume multiplexing program 150 is executed by a processor to copy a physical volume offered by storage unit system 300 through SAN 600 upon the instruction from server 100.

Host 200 includes a processor and a memory (not shown). The memory stores application software 210, an OS 220, and access processing software 230. Application software 210 includes middleware such as backup software and database managing software (DBMS). Access processing software 230 includes a file system and a device driver.

Storage unit system 300 stores/reproduces the data used by host 200 according to a request from server 100 or host 200. Storage unit system 300 includes a control unit 310 and a disk unit 350. Storage unit system 300 offers a storage region on a disk unit 350 in the storage unit system to server 100 or to host 200 as a physical volume 400.

The "physical volume" may correspond to the physical storage region of the disk unit in storage unit system 300 on a one-to-one basis, or correspond to the logical storage region virtualized in storage unit system 300, like an LU (logical unit) in the RAID system. In the following description, however, it does not matter whether the "physical volume" is a logical storage region or the physical storage region of storage unit system 300. Control unit 310 in storage unit system 300A has an internal volume multiplexing program 320 and an external volume multiplexing program 330 in a memory (not shown).

The Internal volume multiplexing program 320 is for realizing the snapshot function previously described. Specifically, internal volume multiplexing program 320 is executed according to an instruction from server 100, host 200 or management terminal 800 when the physical volume in storage unit system 300A is to be copied into another physical volume in storage unit system 300A.

External volume multiplexing program 330 is for realizing the remote copy function previously described. Specifically, external volume multiplexing program 330 is executed according to an instruction from server 100, host 200 or management terminal 800 when the physical volume in storage unit system 300A is to be copied into another physical volume outside storage unit system 300A. In this embodiment, storage unit system 300B has neither internal volume multiplexing program 320 nor external volume multiplexing program 330.

Backup storage unit system 500 is for storing a copy of data stored in storage unit systems 300A and 300B. Backup storage unit system 500 uses a tape unit, a tape library unit, a magnetic disk unit or a magneto optic disk unit as a storage medium. Management terminal 800 is used to obtain or set various data stored in server 100. Specifically, by using management terminal 800, a user sets various data stored in server 100 through network 700 or SAN 600.

Upon setting these data, the user is allowed to instruct server 100 to create, set or delete a virtualized volume, to make the virtualized volume correspond to physical volume 400, or to create, set or delete a virtualized volume pair. Server 100, host 200, control unit 310 in the storage unit system 300 and management terminal 800 have a CPU for executing the software and program or have a memory. The computer system described below establishes an environment in which physical volume 400 offered by storage unit systems 300A and 300B is virtualized through server 100, and is offered as a virtualized volume to host 200.

Figure 2:
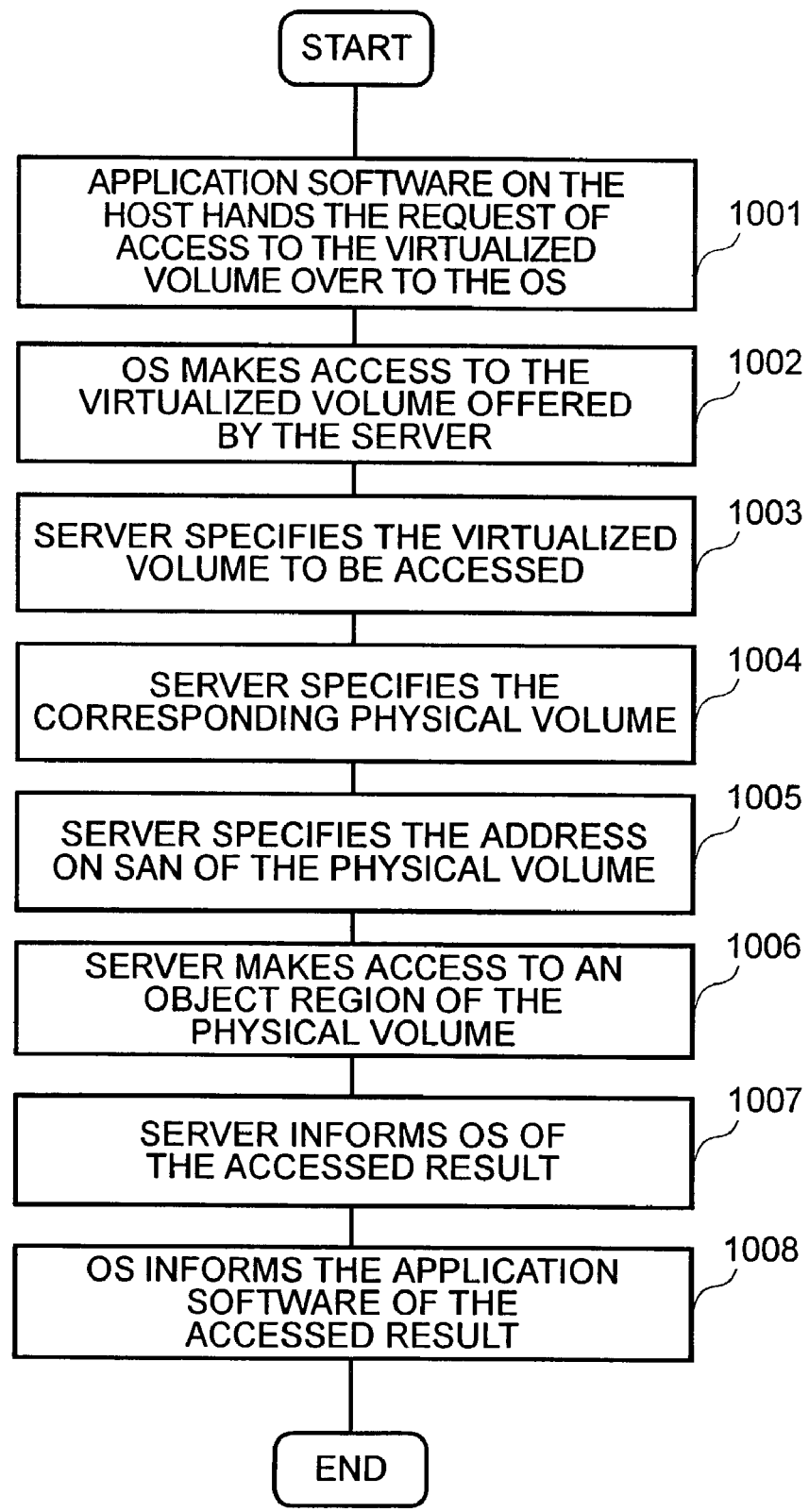
FIGS. 2 and 3 are flowcharts of the procedure by which a host accesses a virtualized volume.

FIG. 2 is a flowchart illustrating a procedure at the time when host 200 accesses (read/write) the virtualized volume. Application software 210 executed by host 200 transmits the virtualized volume and an access request specifying an accessible range on the virtualized volume to OS 220, which has been executed by host 200. When the access is a write request, the request includes the data to be written (1001).

OS 220 accesses the virtualized volume offered by server 100 through SAN 600. Specifically, host 200 transmits the data (address range of the virtualized volume) representing the accessible range of the virtualized volume included in the access request to server 100 through SAN 600. In this case, when the access request is a write request, the data to be written are transmitted with the request (1002).

Server 100, which has received the access request from host 200, specifies the virtualized volume that is to be accessed by using data (parameters) included in the access and by using virtualized volume data 110. Specifically, the access request from host 200 includes the data representing an address of a unit corresponding to the virtualized volume and is connected to the SAN or, includes World Wide Name (WWN) and a logical unit number (LUN). Server 100 retrieves the virtualized volume corresponding to these data from virtualized volume data 110.

The WWN and the like assigned to the virtualized volume are virtual addresses which do not correspond to a physical unit connected to the SAN. In practice, therefore, server 100 determines the virtual address included in the command flowing on the SAN to be an address corresponding to the virtual volume, and responds to the command (1003).

Next, by using mapping data 130, server 100 specifies the region of physical volume 400 corresponding to the address range of the virtual volume requested by the access (1004).

Then, by using physical volume data 120, server 100 specifies an address of the specified physical volume on SAN 600 or, more particularly, specifies a combination of WWN and LUN (1005), and accesses storage unit system 300 having a region of specified physical volume 400, via SAN 600 (1006). Here, "access" stands for reading or writing the data.

The storage unit system that has specified physical volume 400 and server 100, which has finished the access, inform host 200 of the result of access, i.e., the completion of reading the data or of writing the data (1007). Upon receipt of the result of access from server 100, OS 220, which is executed by host 200, informs application software 210, which has requested the access, of the result of access (1008). In the processing shown in FIG. 2, the read data or write data accompanying the access are transferred between host 200 and server 100 and between server 100 and storage unit system 300 via SAN 600.

Figure 3:
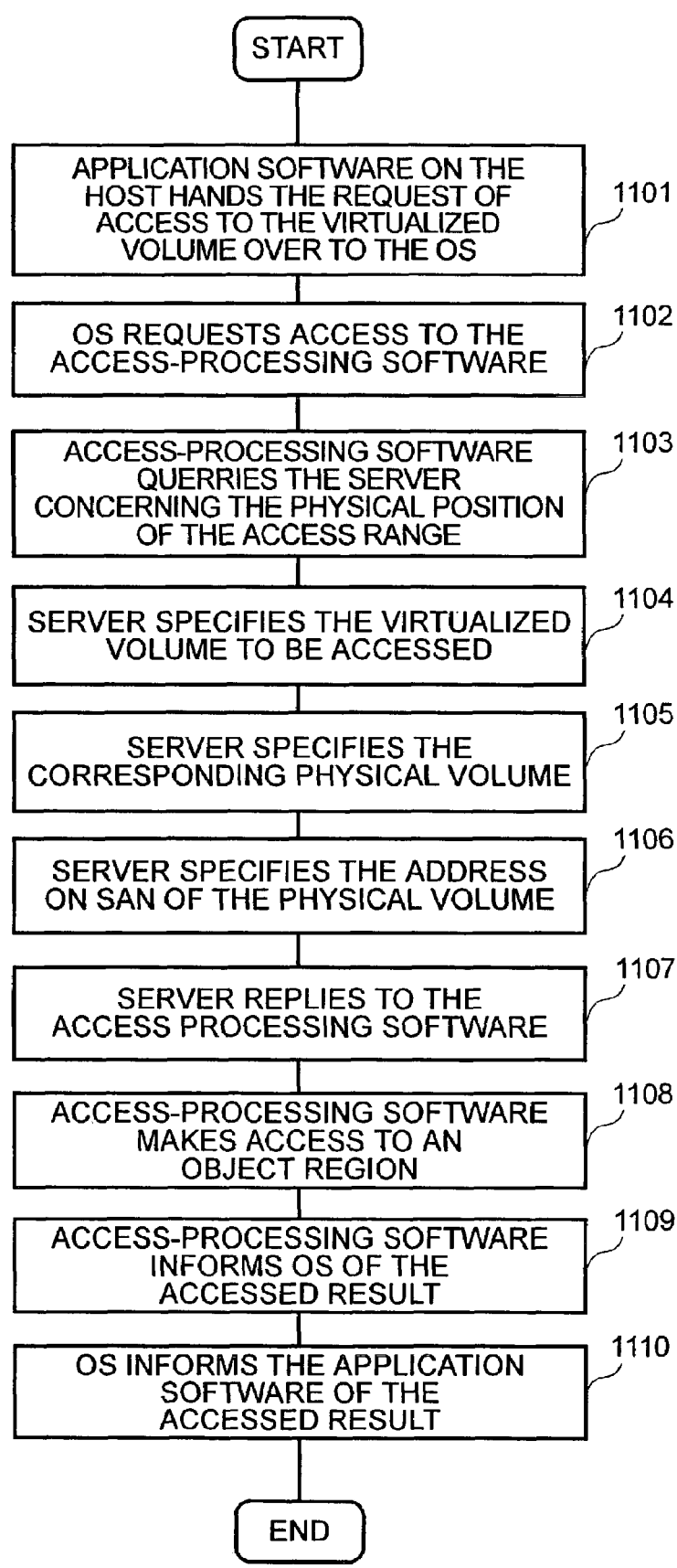

FIG. 3 is a flowchart illustrating a procedure when host 200 accesses (read/write) the virtualized volume, which is different from that of FIG. 2. Application software 210 executed by host 200 transmits the virtualized volume and the access request including the address range of the virtualized volume to OS 220 (1101).

OS 220, which has received the access request, requests server access-processing software 230 executed by host 200 to access the virtualized volume (1102). Access-processing software 230, which has received the request, queries server 100 through network 700 or SAN 600 concerning the range of the physical volume corresponding to the address range of the virtualized volume or, more particularly, concerning storage unit system 300 having a physical volume corresponding to the address range of the virtualized volume and the position of the physical volume in storage unit system 300 (1103).

Server 100 then specifies the virtualized volume to be accessed by using the address range of the virtualized volume included in the query and virtualized volume data 110. The specifying method is the same as that of the method shown in FIG. 2 and is not described here (1104). Thereafter, by using mapping data 130, server 100 specifies the region of physical volume 400 corresponding to the address range of the virtualized volume to be queried or, more particularly, specifies storage unit system 300 containing the corresponding physical volume and the position of the physical volume in storage unit system 300 (1105). Further, by using physical volume data 120, server 100 specifies the address of specified physical volume 400 on SAN 600 (1106).

Thereafter, server 100 transmits to host 200, via network 700 or SAN 600, the address of the specified physical volume on SAN 600, which is the destination to be queried (1107). By using the address on SAN 600 of the physical volume transmitted from server 100, access-processing software 230 uses SAN 600 to access the storage unit system that contains the target physical volume 400. Specifically, host 200 accesses the particular storage unit system 300 based on the address obtained from SAN 600 (1108).

When access-processing software 230 has completed the access to storage unit system 300, access-processing software 230 informs OS 220 of the result of access, e.g., of the completion of reading the data or writing the data (1109). OS 220 informs application software 210, which requested the access of the result of access (1110). In the above processing, the read data or the write data are transferred between host 200 and storage unit 300 via SAN 600.

Due to the processing shown in FIG. 2 or 3, server 100 virtualizes physical volume 400 offered by storage unit systems 300A and 300B, and offers the virtualized volume to host 200. Host 200 is allowed to access storage unit system 300 relying only on the data of the virtualized volume without taking the physical volume of the computer system into consideration.

In the above processing, application software 210 specifies the address range of the virtualized volume. However, application software 210 may, alternatively specify the file name that is to be accessed, and OS 220 or access-processing software 230 then finds the address range of the virtualized volume from the file name that is specified. FIG. 4 is a diagram illustrating an example of virtualized volume data 110. Virtualized volume data 110 stores the virtualized volume and the data for specifying the virtualized volume on the SAN or, more particularly, stores data representing correspondence to WWN and LUN.

The virtualized volume number is for indicating the virtualized volume offered by server 100. The SAN address is an address on SAN 600 assigned to the virtualized volume. Examples of the SAN address are data for specifying a volume in an FC, IP or SCSI protocol, such as a combination of WWN and LUN or a combination of IP address and MAC address.

FIG. 5 is a diagram illustrating an example of physical volume data 120. Physical volume data 120 is a table registering the data related to a physical volume offered by storage unit system 300. The unit number represents the storage unit systems 300A and 300B that can be used by server 100. In this diagram, 0 corresponds to storage unit system 300A and 1 corresponds to storage unit system 300B. The physical volume number represents the physical volume 400 in storage unit systems 300A and 300B that is used by server 100.

The SAN address is the address of physical volume 400 on SAN 600. The vendor identifier represents the name of the vendor that produced storage unit system 300. The model name indicates the name of the model of storage unit system 300. The production number is the one attached to the storage umt system 300 to indicate the production number. The version number is the one shown with the model name of storage unit system 300.

The state represents the state of physical volume 400. Examples of the state include "in use", "unused", "access inhibited", "failed", etc. "In use" is a state where the corresponding physical volume is storing the data used by host 200 and is accessible from server 100 or from host 200. "Unused" is a state where the corresponding physical volume is not storing the data that are to be used by host 200, and can be assigned to the virtualized volume.

"Access inhibited" is a state where the corresponding physical volume is inhibited from being accessed from server 100 or host 200. For example, this state is the one where in executing a process for copying data stored in a physical volume, access to the physical volume is temporarily inhibited. The "failed" state occurs when the corresponding physical volume has failed and is not usable.

Server 100 updates the contents of the states registered to physical volume data 120 by exchanging (hereinafter referred to as "synchronizing") the data to and from control unit 310 for storage unit systems 300. The internal volume multiplexing function is data indicating whether the storage unit system having a corresponding physical volume 400 has internal volume multiplexing program 320. The external volume multiplexing function is data indicating whether the storage unit system having a corresponding physical volume 400 has external volume multiplexing program 330.

In the example of FIG. 5, the storage unit system of the unit No. 0, i.e., storage unit system 300A, has both internal volume multiplexing program 320 and external volume multiplexing program 330, whereas the storage unit system of unit No. 1, i.e., storage unit system 300B, has neither the internal volume multiplexing program nor the external volume multiplexing program.

Though not shown in this embodiment, storage unit system 300 may have either one of the programs, i.e., internal volume multiplexing program 320 or external volume multiplexing program 330. Further, even when storage unit system 300 has internal volume multiplexing program 320, the program often cannot be applied to physical volume 400 of storage unit system 300 due to the nature of physical volume 400. Therefore, the presence of the internal volume multiplexing program 320 (whether it can be applied) is managed for each of the physical volumes 400. Alternatively, the presence of the program may be managed for each of the storage unit systems 300.

In order for server 100 to obtain the data representing the attributes of storage unit system 300 from storage unit system 300, a method of obtaining data by using an SCSI inquiry command or a mode sense command is executed. Though this computer system includes one or a plurality of storage unit systems 300, the storage unit systems 300 are not necessarily the same model or the same version from the same vendor.

In such a case, internal volume multiplexing program 320 and external volume multiplexing program 330 are mounted differently on storage unit system 300 for each of the vendors. Based on a single method of obtaining data, therefore, server 100 is not capable of obtaining the data related to the presence of internal volume multiplexing program 320 from all of the storage unit systems 300 connected to SAN 600.

In such a case, internal volume multiplexing program 320 and external volume multiplexing program 330 are mounted differently on storage unit system 300 for each of the vendors. Based on a single method of obtaining data, therefore, server 100 is not capable of obtaining the data related to the presence of internal volume multiplexing program 320 from all of the storage unit systems 300 connected to SAN 600.

In this case, therefore, the data representing the presence of internal volume multiplexing program 320 is manually set by an administrator through host 200 or management terminal 800. Alternatively, server 100 has stored, in advance, as a table, a list of functions of storage unit systems 300 specified by the vendor names, model names, production numbers and version numbers. Server 100 automatically sets the data related to the presence of internal volume multiplexing program 320 by comparing the data obtained by using the inquiry command with the table.

FIG. 6 illustrates an example of mapping data 130. Mapping data 130 is a table registering the detailed data related to the correspondence between the virtualized volume and physical volume 400. The virtualized volume number represents the virtualized volume offered by server 100. The virtualized volume number corresponds to the virtualized volume number of virtualized volume data 110. The virtualized volume size represents the size of the virtualized volume. The physical volume number represents the number of physical volumes 400 constituting the virtualized volume.

The coupling order is the data representing the order of physical volumes 400 constituting the virtualized volume. Specifically, the coupling order is a number that increases by one starting from 1, and the storage regions of physical volumes 400 are coupled according to the numbers of the coupling order to make up a virtual volume. The unit number represents the storage unit system 300 that includes the corresponding physical volume 400. The unit number corresponds to the unit number of physical volume data 120.

The physical volume number represents physical volume 400 and corresponds to the physical volume number of physical volume data 120. The physical volume range represents a range assigned to a corresponding virtualized volume in physical volume 400. The attribute of multiplexing is the data representing whether the corresponding virtualized volume is related to multiplexing the volume and representing the attribute when they are related. Specifically, the attribute of multiplexing includes data for distinguishing whether the corresponding virtualized volume is the virtualized volume at a copy destination or is the virtualized volume at a copy source.

FIG. 7 illustrates an example of pair state data 140. Pair state data 140 is a table in which data pairs are registered at the time data is copied, such as by snapshot, i.e., a table in which data are registered data that represent a relationship between the virtualized volume at the copy source and the virtualized volume at the copy destination. The pair number represents a pair of virtualized volumes (hereinafter referred to as "virtualized volume pair"), one at the copy destination and the other at the copy source managed by server 100. As shown, there may be only one virtualized volume at the copy source and a plurality of virtualized volumes at the copy destination. The copy source volume represents the number of the virtualized volume at the copy source. The copy destination volume represents the number of the virtualized volume at the copy destination.

Next, described below is a process for creating a copy of the virtualized volume. Specifically, among the physical volumes 400 corresponding to the virtualized volume specified for copying by server 100 on instruction from host 200, physical volume 400 pertaining to storage unit system 300A is copied by internal volume multiplexing program 320 or by external volume multiplexing program 330 in storage unit system 300A. Moreover, physical volume 400 pertaining to storage unit system 300B, is copied as server 100 executes volume multiplexing program 150. This will now be described.

The processing described below are all those that can be executed by both of the systems described with reference to FIGS. 2 and 3. Referring again to FIG. 6, virtualized volume No. 0 which is the copy source of copy containing pair No. 0, is made up of a single physical volume (physical volume 0-0) encompassing physical volume No. 0 that pertains to storage unit system 300A. Storage unit system 300A containing physical volume 0-0 includes both internal volume multiplexing program 320 and external volume multiplexing program 330, which can be applied to physical volume 0-0.

Referring back to FIG. 7, there are two copy destination volumes containing pair No. 0, i.e., virtualized volume 100 and virtualized volume 101. Between them, virtualized volume 100 is made up of a physical volume 0-10 pertaining to storage unit system 300A. That is, the physical volume 0-0 at the copy source and physical volume 0-10 at the copy destination are within the same storage unit system 300A. Accordingly, the data are copied from the physical volume 0-0 onto the physical volume 0-10, i.e., the snapshot is executed, by internal volume multiplexing program 320.

In this case, server 100 needs to instruct storage unit system 300A to copy the data from the physical volume 0-0 onto the physical volume 0-10. When copying is completed, storage unit system 300A informs server 100 that copying has ended. In contrast, virtualized volume 101 is made up of physical volume 1-13 pertaining to storage unit system 300B. That is, physical volume 0-0 at the copy source and physical volume 1-13 at the copy destination exist in different storage unit systems 300. However, the physical volume 0-0 is in an environment in which external volume multiplexing program 330 can be applied thereto. By using external volume multiplexing program 330, storage unit system 300A copies the data from the physical volume 0-0 into the physical volume 1-13, i.e., executes remote copying.

In this case, server 100 needs to instruct storage unit system 300A to copy data from the physical volume 0-0 into the physical volume 1-13 of another storage unit system 300B. Storage unit system 300A receives the instruction and executes external volume multiplexing program 330 to transfer the data to be copied and the data (address, etc.) of the physical volume at the copy destination to storage unit system 300B through SAN 600.

Storage unit system 300B, which is the copy destination, stores the transmitted data into the specified physical volume based upon the data about the physical volume at the copy destination transmitted from storage unit system 300A. When the virtualized volume at the copy source is composed of a plurality of physical volumes, the individual physical volumes can be copied based upon internal volume multiplexing program 320 and external volume multiplexing program 330, provided the internal and external volume multiplexing programs 320, 330 can be applied thereto, and the virtualized volumes can then be copied by coupling them together.

Next, described below is a case when storage unit system 300 has no internal volume multiplexing program 320. Referring to FIG. 6, virtualized volume 1, which is the copy source containing pair No. 1 is composed of physical volume 1-0 pertaining to storage unit system 300B. Storage unit system 300B containing physical volume 1-0 includes neither internal volume multiplexing program 320 nor external volume multiplexing program 330.

Referring to FIG. 7, the copy destination volume containing pair No. 1 is virtualized volume 102. According to FIG. 6, virtualized volume 102 is made up of physical volume 1-10 in storage unit system 300B. That is, storage unit system 300B is not capable of copying data from the copy source physical volume 1-0 into the copy destination physical volume 1-10. In this case, the data are copied from the copy source physical volume 1-0 into the copy destination physical volume 1-10 by volume multiplexing program 150 in server 100. Specifically, server 100 reads the data in physical volume 1-0 into server 100 through SAN 600, and writes them into physical volume 1-10 through SAN 600.

Next, described below is a case where the virtualized volume is made up by coupling physical volumes offered by a plurality of storage unit systems. Referring to FIG. 6, virtualized volume 2, which is a copy source containing pair No. 2, is made up by coupling the physical volume 0-2 pertaining to storage unit system 300A and the physical volume 1-2 pertaining to storage unit system 300B.

Here, as shown in FIG. 5, internal volume multiplexing program 320 can be applied to physical volumes 0-2, but cannot be applied to physical volumes 1-2. Referring to FIG. 7, moreover, the copy destination volume of pair No. 2 is virtualized volume 103. According to FIG. 6, virtualized volume 103 is made up of physical volume 0-12 contained in storage unit system 300A and by physical volume 1-12 contained in storage unit system 300B. In this case, the data are copied from physical volume 0-2 into physical volume 0-12 by internal volume multiplexing program 320 in storage unit system 300A. In addition, the data are copied from physical volume 1-2 into physical volume 1-12 by volume multiplexing program 150 in server 100. After both sets of data have been copied, server 100 couples the copy destination physical volumes and completes the formation of virtualized volume 103 as a copy of virtualized volume 2.

Figure 8:
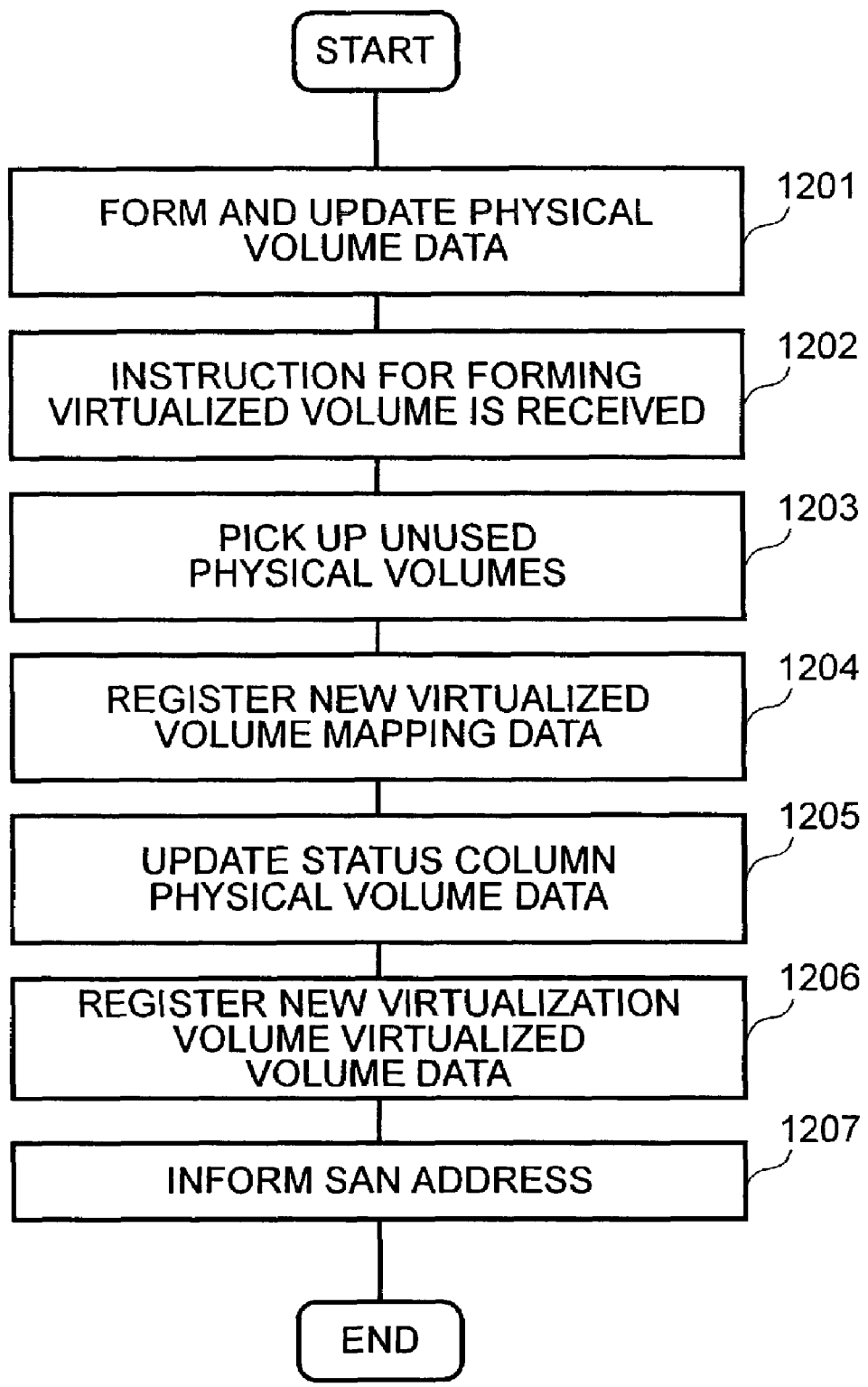
FIG. 8 is a flowchart of a procedure for creating a virtualized volume.

Next, described below are the creation of a virtualized volume, the creation of a copy (multiplexing) of a virtualized volume, cancellation of the paired state of virtualized volumes (cancellation of multiplexing), and deletion of a virtualized volume. FIG. 8 is a flowchart of a procedure by which server 100 creates a virtualized volume.

In response to a SCSI inquiry command and a mode sense command, server 100 obtains data from storage unit systems 300A, 300B on SAN 600, and the data about physical volumes 400 pertaining thereto, and develops or updates physical volume data 120. The internal volume multiplexing program and the external volume multiplexing program are set by the method described above (1201).

Server 100 receives a request for to create a virtualized volume and a size of the virtualized volume from host 200 or management terminal 800 (1202). Then, server 100 picks up physical volumes in the "unused" state from physical volume data 120 (1203). Thereafter, server 100 combines these physical volumes to a required size to create a virtualized volume. Server 100 registers the data related to the virtualized volume to mapping data 130 (1204).

Server 100 updates the state in physical volume data 120 of the physical volume used as the virtualized volume to "in use" (1205). Server 100 assigns the address on the SAN to the virtualized volume, registers it in virtualized volume data 110 (1206), and informs host 200 or management terminal 800 of the SAN address that is assigned (1207).

Figure 9:
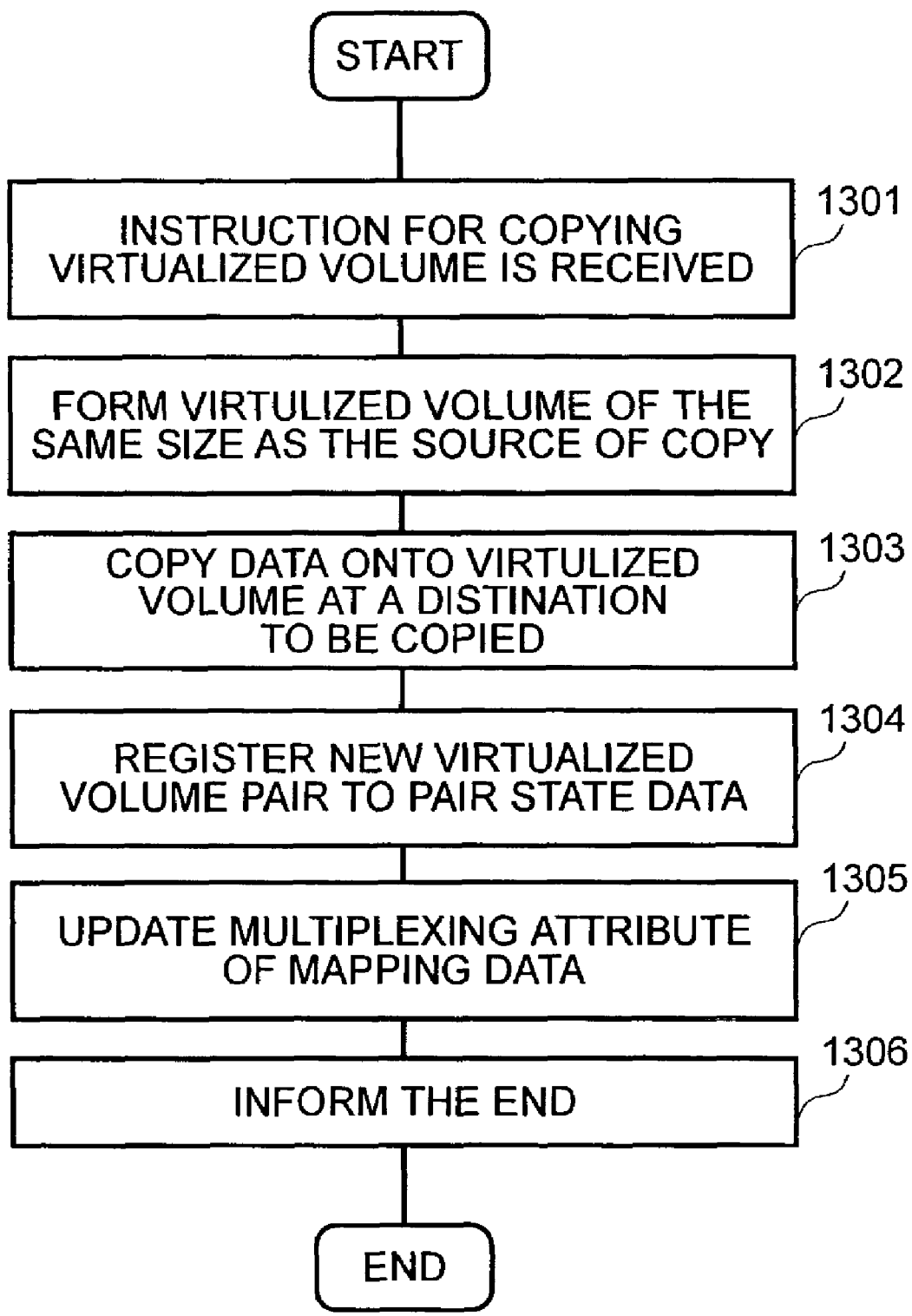
FIG. 9 is a flowchart of a procedure for creating a copy of the virtualized volume.

FIG. 9 is a flowchart of a procedure of by which server 100 creates a new copy of the virtualized volume. Server 100 receives an instruction from host 200 or management terminal 800 to create a copy of a virtualized volume (1301). Server 100 executes the processing described above for creating the virtualized volume to create a virtualized volume of the same size as that of the copy source (1302).

Then, server 100 copies the data of the virtualized volume at the copy source into the virtualized volume at the copy destination based on the method described above. Specifically, an instruction for copying is sent to storage unit system 300, which is the copy source, or server 100 copies the data in storage unit system 300 or between the storage unit systems (1303). Thereafter, server 100 registers a pair of newly virtualized volumes in pair state data 140 (1304) and updates the multiplexing attribute of mapping data 130 (1305). After the updating is finished, server 100 informs host 200 or management terminal 800 of the completion of the data copying (1306).

At this time, the pair of virtualized volumes have the same content. Further, when a request is generated from host 200 for writing data into the virtualized volume at the copy source, and when internal volume multiplexing program 320 or external volume multiplexing program 330 can be applied to the physical volume at the copy source of copy corresponding to the virtualized volume at the copy source, storage unit system 300 reflects the updating of data onto the physical volume at the copy destination by using the volume multiplexing function.

When the internal or external volume multiplexing function cannot be utilized, server 100 writes the same data onto the virtualized volume at the copy destination by using volume multiplexing program 150 in the server. Relying upon this processing function, server 100 renders the contents of the pair of virtualized volumes the same.

Specifically, the server 100, which is instructed to write the data onto the storage unit system 300, confirms the presence of such a function as copying data of storage unit system 300 and the presence of a pair in the virtualized volume into which the data are instructed to be written, and confirms whether it is necessary to use volume multiplexing program 150 in the server 100. Thereafter, server 100 either copies the data by using volume multiplexing program 150 in server 100 or sends an instruction for copying data onto storage unit system 300.

Figure 10:
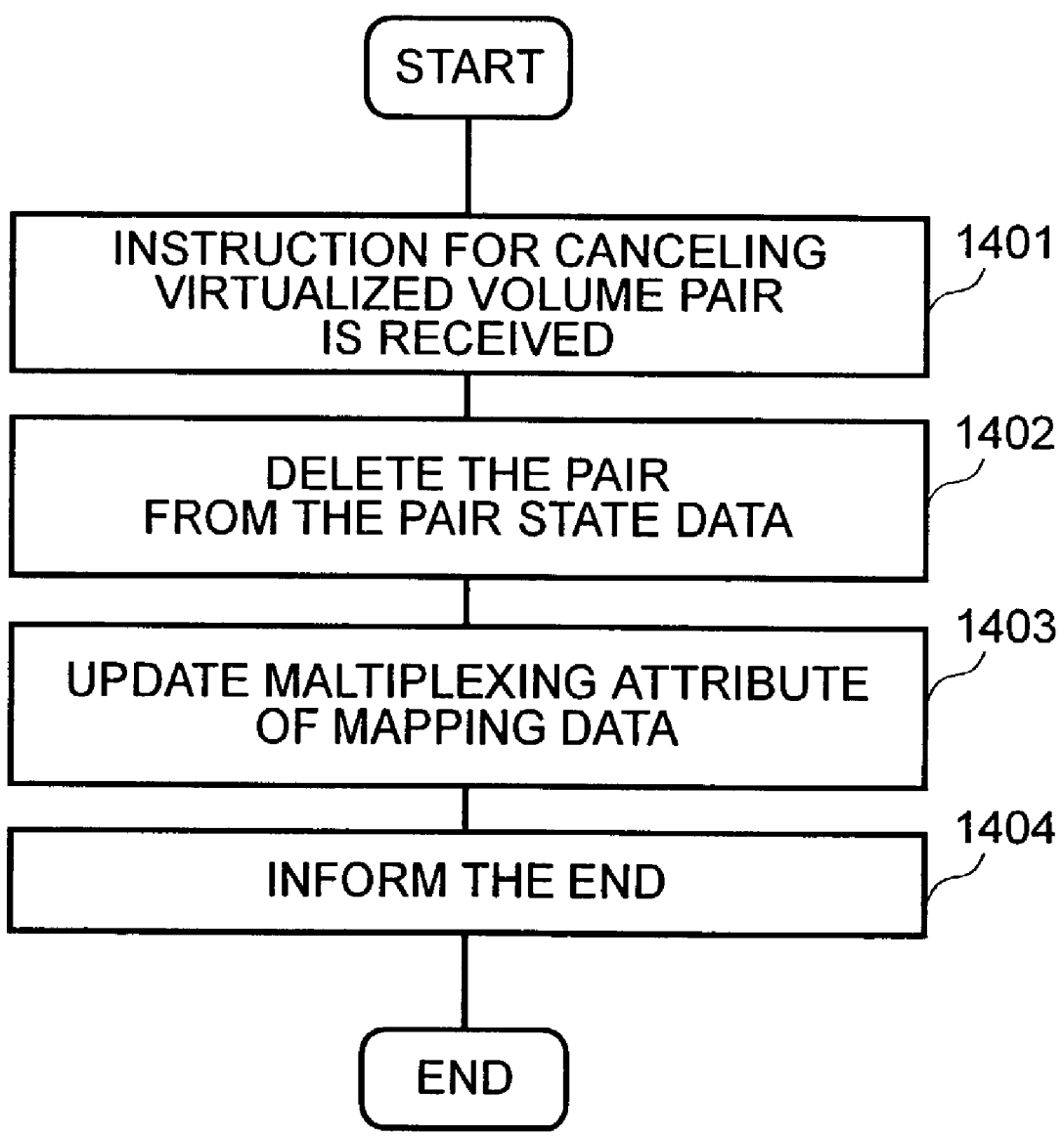
FIG. 10 is a flowchart of a procedure for canceling a virtualized volume pair.

FIG. 10 is a flowchart of a procedure by which server 100 cancels the paired state of the virtualized volumes. Server 100 receives an instruction for canceling the paired state of the virtualized volumes from host 200 or management terminal 800 (1401). Server 100 deletes the data of the corresponding pair from pair state data 140 (1402), and updates the multiplexing attribute of mapping data 130

(1403). Thereafter, server 100 informs host 200 or management terminal 800 of the completion of the paired state canceling processing (1404).

In this case, the virtualized volume which was the virtualized volume at the copy destination becomes a static image copy (snapshot copy) of the virtualized volume at the copy source when the paired state was canceled. The computer system is allowed to use the snapshot copy for backup.

Figure 11:
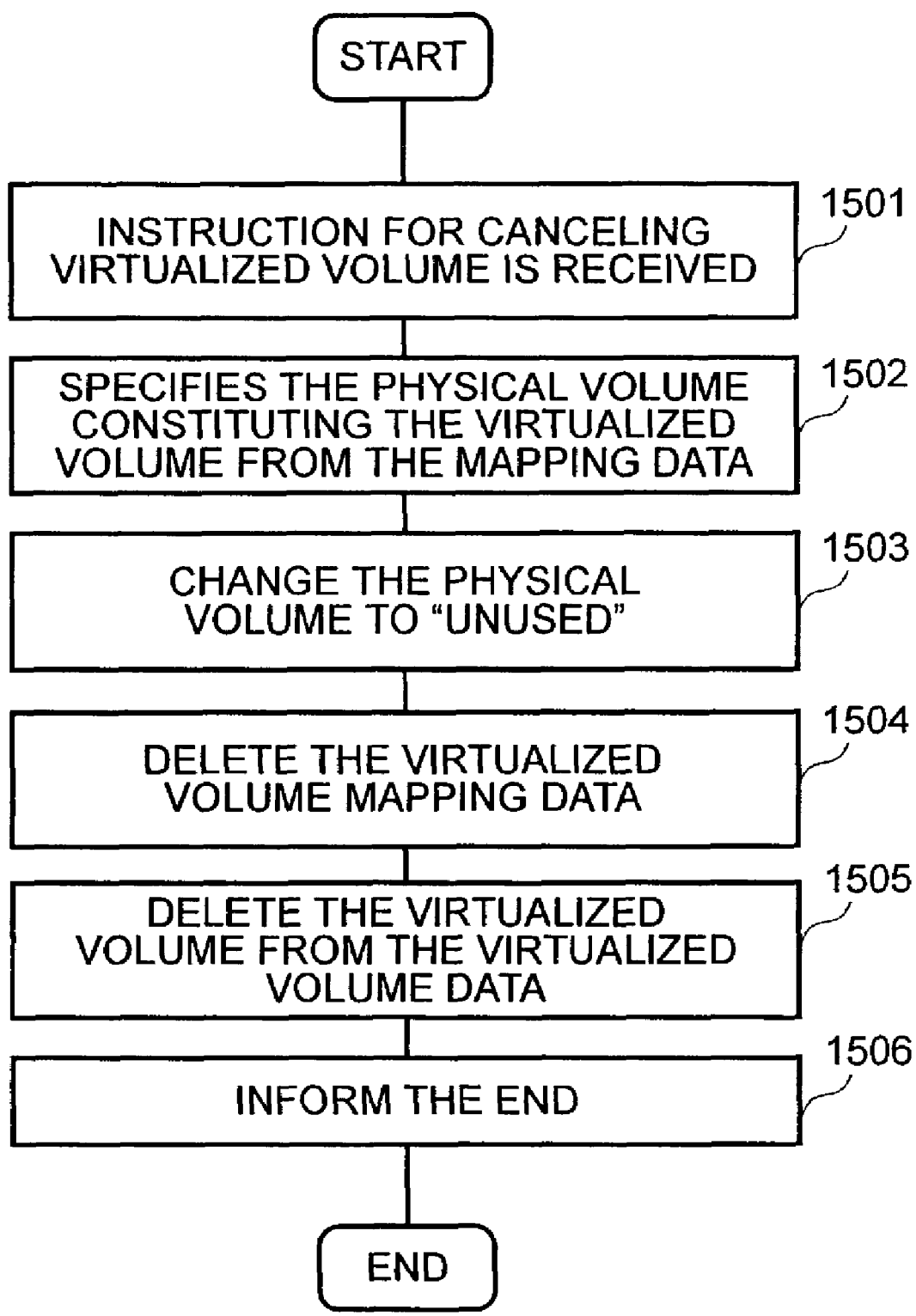
FIG. 11 is a flowchart of a procedure for deleting the virtualized volume pair.

FIG. 11 is a flowchart of a procedure by which the server 100 deletes the virtualized volume. Server 100 receives an instruction for deleting a virtualized volume from host 200 or management terminal 800 (1501). Server 100 specifies a physical volume that constitutes the corresponding virtualized volume (1502) from mapping data 130.

Thereafter, server 100 changes the state of physical volume data 120 corresponding to the specified physical volume to "unused" (1503), and deletes the data of the corresponding virtualized volume from mapping data 130 (1504). Server 100 then deletes the data of the corresponding virtualized volume from virtualized volume data 110, and opens the SAN address (1505). Server 100, after having finished these processing steps, informs host 200 or management terminal 800 of the completion of the deletion of the virtualized volume (1506).

When it is desired to back up the virtualized volume at any given moment, this computer system uses the following procedure. First, the computer system creates a copy of a virtualized volume that is to be backed up and, then, conducts the processing for canceling the paired state of the virtualized volume. Then, the virtualized volume at the copy destination that is copied becomes a snapshot of the virtualized volume at the copy source at the time when processing is conducted to cancel the paired state. In this state, the computer system backs up the data into the backup storage unit system from the virtualized volume at the copy destination. Based on this processing, the computer system executes the backing up without being affected by updating of the virtualized volume at the copy source.

In this backup processing, too, if external volume multiplexing program 330 can be adapted to the physical volume(s) constituting the virtualized volume, then, its function is utilized, and volume multiplexing program 150 in server 100 is executed for the physical volumes to which the above program cannot be applied. In this embodiment, when the pair state is to be created again after the backup has been completed by the computer system, it is possible to simply copy all the data as in the case of creating a copy of the virtualized volume. However, there is a method in which only the updated data of the virtualized volume at the copy source are stored as differential data by server 100 during a period in which the pair state has been canceled, and only the differential data only are copied into the virtualized volume at the copy destination at the time of creating the pair state again. It is further allowed to utilize a method of designating a place where the data are updated by using a bit map.

In a computer system for realizing a virtualization environment handling a virtualized volume according to the embodiments, when there exists a storage unit having a snapshot function and a remote copy function and a storage unit without such functions, the volume multiplexing program of the storage unit system is applied to the physical volumes constituting the virtualized volume, if that program can be applied, and the volume multiplexing program in the server is used if the above volume multiplexing program cannot be applied, thereby efficiently creating a copy of the virtualized volume. The snapshot of the virtualized volume can be efficiently obtained by creating the copy, and the data stored in the virtualized volume can be easily backed up.

In this invention, there may exist not only one virtualized volume at the copy destination but also a plurality of virtualized volumes at the copy destination. For example, there is a storage unit system having an external volume multiplexing program that is capable of executing the control operation for creating only one virtualized volume at the copy destination but if there are a plurality of virtualized volumes at the copy destination, then, one of the virtualized volumes at the copy destination of copy is executed by the external volume multiplexing program contained in the storage unit system and the rest of the virtualized volumes at the copy destination are executed by the volume multiplexing program contained in the server. Thus, the computer system works to copy the plurality of virtualized volumes. This enables the functions possessed by the storage unit system to be utilized without waste.

In this embodiment, server 100 stores the relationship between the virtualized volume number and the address on the SAN corresponding to the virtualized volume as virtualized volume data 110, and uses the virtualized volume number as the data that represent the correspondence between the virtualized volume and the physical volume. It is, however, also allowable to omit the use of the virtualized volume number and, instead, directly use an address on the SAN corresponding to the virtualized volume as data to represent the correspondence between the virtualized volume and the physical volume. Thus, the pair of virtualized volumes may be such that the storage regions of the pair have sizes which are in agreement but need not be such that the storage regions of the physical volumes constituting the virtualized volumes have sizes which are in agreement.

In this embodiment, volume multiplexing program 150 is provided on server 100 to compensate for the lack of that function in storage unit system 300B. Similarly, when server 100 has a RAID software program, and the storage unit system without a RAID hardware function such as JBOD is connected to SAN 600, the storage region in JBOD can be turned into a RAID by using the RAID software function of server 100 side. Server 100, then, conceals differences in the functions of various storage unit systems and offers the systems as a single storage unit system for the users.

The invention provides a computer system for copying the virtualized storage regions and a method of forming a copy in a computer system which includes storage unit systems of different performance abilities and virtualizes the storage regions.

What is claimed is:

1. A computer system comprising:
   a first computer;
   a second computer; and
   a storage unit system;
   wherein said first computer, said second computer, and said storage unit system are connected to a network, and the first computer comprises a storage area network (SAN) server;
   wherein the first computer:
   offers a storage region possessed by the storage unit system as a virtual storage region to the second computer;
   receives a first instruction for the virtual storage region from the second computer;
   determines whether the storage unit system is capable of performing the first instruction; and
   either sends an instruction corresponding to the first instruction to the storage unit system if it is determined that the storage unit system can perform the first instruction, or itself performs the processing corresponding to the first instruction and provides the result of performing the first instruction to the storage unit system if it is determined that the storage unit system cannot perform the first instruction;

wherein the computer system is adapted to respond to the first instruction relating to copying the virtual storage region such that when the virtual storage region is formed by coupling physical volumes having a first volume that can be copied by the storage unit system and a second volume that cannot be copied by the storage unit system, the data in the first volume is copied by the storage unit system and the data in the second volume is copied by the first computer and, after both sets of data have been copied, the first computer couples the data copied by the first volume and the data copied by the first computer from the second volume and completes the copying of the virtual storage region as a copy of the data copied from the first and second volumes.

2. A computer system according to claim 1, wherein:
the instruction is one for copying the virtual storage region;
the instruction for the instruction is one for copying a storage region possessed by the storage unit system corresponding to the virtual storage region onto other storage regions;
and the processing for the instruction is one for reading data from the storage region possessed by the storage unit system corresponding to the virtual storage region, and transferring the data to other storage regions.

3. A computer system comprising:
a first computer;
a second computer; and
a storage unit system;
wherein said first computer, said second computer, and said storage unit system are connected to a network, and the first computer comprises a storage area network (SAN) server;
wherein the first computer:
offers a storage region possessed by the storage unit system as a virtual storage region for storing data to the second computer;
receives an instruction for copying the virtual storage region from the second computer;
determines whether or not the storage unit system can perform the copying instruction; and
either instructs the storage unit system to copy the storage region possessed by the storage unit system corresponding to the virtual storage region onto a separate storage region possessed by the storage unit system if it is determined that the storage unit system can perform the copying instruction, or reads the data from the storage region possessed by the storage unit system corresponding to the virtual storage region and writes the data onto a separate storage region possessed by the storage unit system if it is determined that the storage unit system cannot perform the copying instruction; and
wherein the computer system is adapted to respond to the copying instruction for copying the virtual storage region such that when the virtual storage region is formed by coupling physical volumes having a first volume that can be copied by the storage unit system and a second volume that cannot be copied by the storage unit system, the data in the first volume is copied by the storage unit system and the data in the second volume is copied by the first computer and, after both sets of data have been copied, the first computer couples the data copied by the first volume and the data copied by the first computer from the second volume and completes the copying of the virtual storage region as a copy of the data copied from the first and second volumes.

4. A computer system according to claim 3, wherein the first computer has a table storing the characteristics of the storage unit system, and selectively executes the processing based upon the data stored in the table.

5. A computer system according to claim 4, wherein the table stores the data related to whether the storage unit system has a function for copying the data stored in the storage unit system within the storage unit system.

6. A computer system according to claim 5, wherein the table stores the data related to whether the storage unit system has a function for transferring the data stored in the storage unit system to a storage unit system different from the above storage unit system.

7. A computer system according to claim 1, wherein:
the instruction is the one for writing the data into the virtual storage region;
the instruction for the instruction is the one for having the data written into the storage unit system corresponding to the virtual storage region;
and the processing for the instruction is the one for operating the storage unit system as a RAID.

8. A computer system according to claim 1, wherein the storage unit system further comprises:
a control unit; and
a plurality of disk units;
wherein the control unit offers the storage regions possessed by the plurality of disk units as a plurality of storage regions to the first computer; and
wherein the virtualized storage region is constituted by the plurality of storage regions offered by the control unit.

9. A computer system according to claim 2, wherein the plurality of storage regions constituting the virtualized storage region are corresponded to different disk units among the plurality of disk units.

10. A computer connected to a host computer and to a storage unit system via a communication network, comprising:
a processor; and
a memory;
wherein the computer comprises a storage area network (SAN) server and:
offers a storage region possessed by the storage unit system as a virtual storage region for storing data to the host computer; receives an instruction from the host computer for copying the virtual storage region; determines whether or not the storage unit system can perform the copying instruction; and either instructs the storage unit system to copy the storage region possessed by the storage unit system corresponding to the virtual storage region onto a separate storage region possessed by the storage unit system if it is determined that the storage unit system can perform the copying instruction, or reads the data from the storage region possessed by the storage unit system and writes the data onto a separate storage region possessed by the storage unit system if it is determined that the storage unit system cannot perform the copying instruction;
wherein the computer system is adapted to respond to the copying instruction for copying the virtual storage region such that when the virtual storage region is formed by coupling physical volumes having a first volume that can be copied by the storage unit system and a second volume that cannot be copied by the storage unit system, then the data in the first volume is copied by the storage unit system and the data in the second volume is copied by the computer and, after both sets of data have been copied, the computer couples the data copied by the first volume and the data copied by the computer from the second volume and completes the copying of the virtual storage region as a copy of the data copied from the first and second volumes.

11. A computer connected to a first computer and to a storage unit system according to claim 10, wherein the computer collects the data related to the characteristics of the storage unit system from the storage unit system.

12. A method of copying data in a computer system having a first computer, a second computer and a storage unit system connected to the first computer and to the second computer, the first computer comprising a storage area network (SAN) server, the method comprising the steps of:
allowing the first computer to determine whether the storage unit system has means for creating a copy of a storage region possessed by the storage unit system;
determines whether or not the storage unit system can perform a copy operation; and
either instructing the storage unit system to copy the storage region if it is determined that the storage unit system can perform the copy operation, or performing the copy operation itself by reading data from the storage region and writing the data into a predetermined storage region of the storage unit system if it is determined that the storage unit system cannot perform the copy operation;
wherein, the computer system is adapted to perform the copy operation for copying the storage region such that when the storage region is formed by coupling physical volumes having a first volume that can be copied by the storage unit system and a second volume that cannot be copied by the storage unit system, then the data in the first volume is copied by the storage unit system and the data in the second volume is copied by the first computer and, after both sets of data have been copied, the first computer couples the data copied by the first volume and the data copied by the first computer from the second volume and completes the copying of the storage region as a copy of the data copied from the first and second volumes.

13. A computer system comprising:
a first computer;
a second computer; and
a storage unit system connected to the first computer and to the second computer;
wherein the first computer comprises a storage area network (SAN) server and:
offers a storage region possessed by the storage unit system as a virtual storage region to the second computer;
determines whether or not the storage unit system can perform processing operations on the storage region possessed by the storage unit system corresponding to the virtual storage region; and
either instructs the storage unit system to perform the processing operations if it is determined that the storage unit system can perform the processing operations, or itself performs the processing operations on the storage region possessed by the storage unit system if it is determined that the storage unit system cannot perform the processing operations;
wherein the computer system is adapted to perform the processing operations for copying the storage region such that when the storage region is formed by coupling physical volumes having a first volume that can be copied by the storage unit system and a second volume that cannot be copied by the storage unit system, then the data in the first volume is copied by the storage unit system and the data in the second volume is copied by the first computer and, after both sets of data have been copied, the first computer couples the data copied by the first volume and the data copied by the first computer from the second volume and completes the copying of the virtual storage region as a copy of the data copied from the first and second volumes.

14. A computer system comprising:
a first computer; and
a storage unit system connected to the first computer;
wherein the first computer comprises a storage area network (SAN) server and:
offers a storage region possessed by the storage unit system as a virtual storage region to a second computer connected to the storage unit system;
receives an first instruction for the virtual storage region from the second computer;
if the first computer determines that the storage unit system can itself service the first instruction, then the first computer transmits an instruction corresponding to the first instruction to the storage unit system; and
if the first computer determines that the storage unit system cannot service the first instruction, then the first computer itself executes processing to service the first instruction for the storage region possessed by the storage unit system corresponding to the virtual storage region;
wherein the computer system is adapted to respond to the first instruction for copying the virtual storage region such that when the virtual storage region is formed by coupling physical volumes having a first volume that can be copied by the storage unit system and a second volume that cannot be copied by the storage unit system, then the data in the first volume is copied by the storage unit system and the data in the second volume is copied by the first computer and, after both sets of data have been copied, the first computer couples the data copied by the first volume and the data copied by the first computer from the second volume and completes the copying of the virtual storage region as a copy of the data copied from the first and second volumes.

15. A computer system according to claim 1, wherein the storage region of the storage unit system is a logical unit or a physical volume.

16. A computer system according to claim 3, wherein the storage region of the storage unit system is a logical unit or a physical volume.

17. A computer connected to a first computer and to a storage unit system according to claim 10, wherein the storage region of the storage unit system is a logical unit or a physical volume.

18. A method according to claim 12, wherein the storage region of the storage unit system is a logical unit or a physical volume.

19. A computer system according to claim 13, wherein the storage region of the storage unit system is a logical unit or a physical volume.

20. A computer system according to claim 1, wherein:
said first and second computer and said storage unit system are connected via a SAN; and
said first instruction is to copy data of said storage unit system.

* * * * *